United States Patent [19]
Andersson

[11] Patent Number: 5,366,408
[45] Date of Patent: Nov. 22, 1994

[54] DISTRIBUTION UNIT FOR A VENTILATION INSTALLATION FOR A VEHICLE

[75] Inventor: Roland Andersson, Sollebrunn, Sweden

[73] Assignee: Saab Automobile Aktiebolag, Sweden

[21] Appl. No.: 122,402

[22] PCT Filed: Mar. 24, 1992

[86] PCT No.: PCT/SE92/00185
§ 371 Date: Sep. 27, 1993
§ 102(e) Date: Sep. 27, 1993

[87] PCT Pub. No.: WO92/17345
PCT Pub. Date: Oct. 15, 1992

[30] Foreign Application Priority Data
Mar. 28, 1991 [SE] Sweden ............................ 9100930-8

[51] Int. Cl.$^5$ ............................................. B60H 1/24
[52] U.S. Cl. .................................................. 454/121
[58] Field of Search ............... 454/121, 126, 159, 160, 454/161

[56] References Cited
U.S. PATENT DOCUMENTS
5,062,352  11/1991  Ostrand ........................... 454/121

FOREIGN PATENT DOCUMENTS
1071000  8/1954  France ........................... 454/159
1359909  3/1964  France .
3119557  3/1982  Germany ........................ 454/121
3421323  12/1985  Germany ........................ 454/121

Primary Examiner—Harold Joyce
Attorney, Agent, or Firm—Ostrolenk, Faber, Gerb & Soffen

[57] ABSTRACT

A distribution unit for a ventilation installation for a vehicle has a housing (2) which is provided with outlets (3–10) and has an at least partly cylindrical shell surface in which a valve device (13) is rotatable inside the cylindrical housing via a shaft (14) which is along the axis of the shell surface of the housing. In the cylindrical shell surface of the housing there is at least one concavity (20) which via an aperture (21) which is within the housing and is situated substantially in a radial plane of the housing is connected to the interior of the housing and forms an outlet (6). A thin-walled circular valve element (18) which is incorporated in the valve device (13) and is disc-shaped or basin-shaped cooperates with the aperture and is rotatable in the aforesaid radial plane.

17 Claims, 5 Drawing Sheets

DISTRIBUTION UNIT FOR A VENTILATION INSTALLATION FOR A VEHICLE

BACKGROUND OF THE INVENTION

The present invention concerns a distribution unit for a ventilation installation for a vehicle, intended to distribute ventilation air to ventilation orifices in the vehicle, with a housing which is provided with an at least partly cylindrical shell surface and in which a valve device is rotatable via a shaft which is parallel to the shell surface of the housing, in order to control the air flow to at least one outlet placed in the shell surface.

Ventilation installations for vehicles usually include a ventilation housing in which air is introduced and tempered before being supplied by means of a distribution unit to the vehicle's interior via a number of orifices placed at various points in that interior. Such orifices may for example take the form of defroster orifices, instrument panel orifices, vehicle interior orifices and floor orifices. The distribution of ventilation air among the various outlets in the distribution unit is usually accomplished by means of a number of dampers which can be used to close or open these outlets. Such a ventilation installation is therefore of relatively complicated construction with a number of different dampers and control devices. The distribution unit therefore has a bulky and complicated design to be able to accommodate the components involved.

Attempts have been made to simplify the distribution unit by using a valve device in the form of a planar damper to direct the air distribution to three different outlets in the shell surface on the distribution unit housing, but this involves the disadvantage of not being able to control each outlet individually in the same manner as when separate dampers are used.

To achieve simpler construction of the distribution unit while still being able to accomplish individual control of numerous different outlets in a desired sequence, it has been proposed to provide the distribution unit housing with outlets both in the shell surface and in the ends, while the valve device is cylindrical and has a shell surface and ends in which there are apertures which by rotation of the valve device can be made to coincide with corresponding outlets in the shell surface and ends of the housing. A disadvantage of this arrangement, however, is that where numerous outlets are desired the valve device and hence also the housing have to be of relatively great axial length.

SUMMARY OF THE INVENTION

The object of the invention is to achieve a shorter and simpler distribution unit than previously, while maintaining the possibility of distributing air as desired.

This object is realised according to the invention by the distribution unit according to the invention. The distribution unit of the invention distributes ventilation air to ventilation orifices in a vehicle. The unit includes an external housing with an at least partly cylindrical shell surface and a separate valve device positioned in and rotatable in the shell. A rotation shaft is connected with the valve device. There is at least one outlet in the shell surface of the housing defined by a concavity or depression in the shell surface. The concavity is open at one axial side and that opening or aperture is directed substantially toward a radial plane located in the interior of the housing. The valve device includes a circular valve element for cooperating with the aperture to the concavity. The valve element is rotatable with respect to the aperture. The valve element includes a radially outer portion with a cutout in it that is shaped to open a path past the valve element through the aperture and as the disk is rotated, to partially close or completely close off the aperture. The valve element also forms a separating wall in the housing. The cut out permits air flow past the valve element either into the concavity of the outlet from the shell, or when the cut out is not aligned with the aperture into the concavity, axially outward toward the end of the housing. The housing may have an outlet beyond the circular valve element through which that air passing the cutout may exit. Various details of the valve element and cut out arrangement are also disclosed, including a plurality of the outlets in the shell surface each having a respective valve element associated with it, shaping of the valve element as a flat disk shape or with a convexity directed toward the aperture into the concavity of the housing. An additional valve element may be positioned axially outward from the first mentioned valve element toward the end of the housing.

The result is an arrangement in which an outlet in the shell surface of the housing can be controlled by a very simple valve element which does not require a shell surface in which there are one or more apertures. The valve element can thus be made narrow and can without major difficulty from the flow point of view meet an incoming air flow with its edge. This solution can with particularly great advantage be used to shorten the housing in an arrangement in which the valve device also includes two axially separate outer valve elements placed at the ends of the housing to cooperate with outlets in the shell surface and ends of the housing, and these outer valve elements are of greater axial extent than intermediate disc-shaped valve elements. The number of intermediate circular valve elements concerned is suitably at least two.

BRIEF DESCRIPTION OF THE DRAWINGS

The invention is explained below in more detail by means of embodiment examples shown in the accompanying drawings in which.

DESCRIPTION OF PREFERRED EMBODIMENTS

Figure 1:
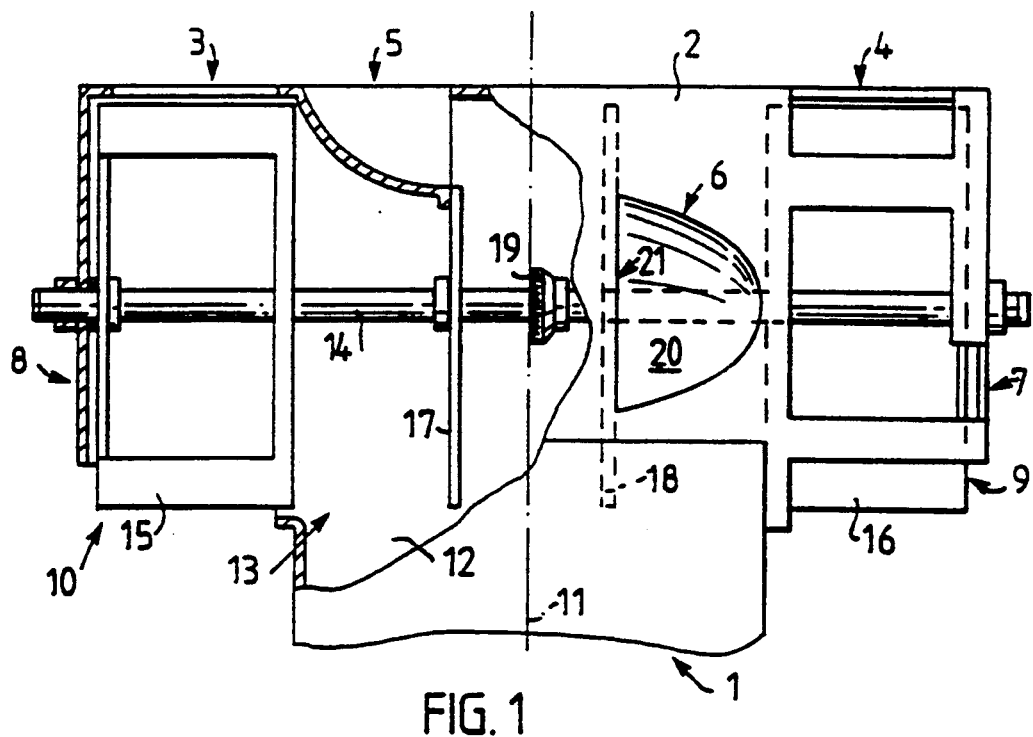
FIG. 1 shows, partly in section, a front view of a distribution unit according to the invention.

A ventilation installation for a vehicle includes according to the invention a distribution unit 1 by means of which air can be distributed to various blowing orifices in the vehicle's interior to provide ventilation inside the vehicle as appropriate to the circumstances. The distribution unit 1 has a housing 2 of essentially circular cylindrical cross-section which has both in its shell surface and in its ends a number of outlets intended to be connected to various blowing orifices in the vehicle's interior via suitable ducts (not shown). Thus, for example, the outlets 3 and 4 at the top of the housing 2 may be intended for defroster orifices, while the outlets 5 and 6 may be intended for ventilation in the middle of the vehicle's interior by the outlet 5 being led to the instrument panel and the outlet 6 to the rear portion of the vehicle's interior. An outlet 7 at the right end of the housing 2 provides the floor space on the right of the vehicle's interior with air via orifices, and a corresponding outlet 8 at the left end of the housing provides the floor space on the left of the vehicle's interior with air via orifices. A further outlet 9 at the right end of the housing 2 provides the side windows and rear window on the right of the vehicle's interior with air, and at the left end of the housing 2 there is an outlet 10, which is opposite to the outlet 9, for the left side of the vehicle's interior. The various outlets in the housing 2 are grouped on both sides of a centreline 11 of the housing 2. At the bottom of the housing 2 is connected an inlet 12 for air which is tempered as desired in a usual manner in an installation of a conventional kind not shown in greater detail.

Mounted for rotation inside the housing 2 is a valve device 13 which by rotation can be made to open or close the various outlets in the shell surface and ends of the housing 2. The valve device 13 comprises a number of axially separate valve elements 15-18 mounted rigidly on a common shaft 14. The shaft is positioned centrally in the circular cylindrical housing, parallel to the shell surface of the housing. Mounted on the shaft 14 is a dog 19 in the form of a gearwheel which is intended to mesh with a corresponding dog on a shaft which projects into the housing and forms part of an operating arrangement not shown in greater detail for rotating the valve device 13.

The two outer valve elements 15 and 16 are of relatively great axial extent and each have their shell wall and an end adjoining it which faces the respective end of the housing. Suitably shaped apertures in the shell walls and ends allow at various rotational positions the discharge of air via pertinent outlets in the shell surface and ends of the housing 2. The housing 2 and the valve device 13 are so designed that the two outer valve elements 15 and 16 are each located on their respective sides of the inlet 12, situated close to the inlet, through which air makes its way unhindered to these valve elements. An arrangement with such valve elements was previously described in Swedish patent application no. 9002950-5, to which reference is hereby made for further details. The two middle valve elements 17 and 18 are thin-walled circular disc dampers and are located centrally to the inlet 12. Owing to their slight axial extent, they create no significant hindrance to air flowing into the housing.

Figure 2:
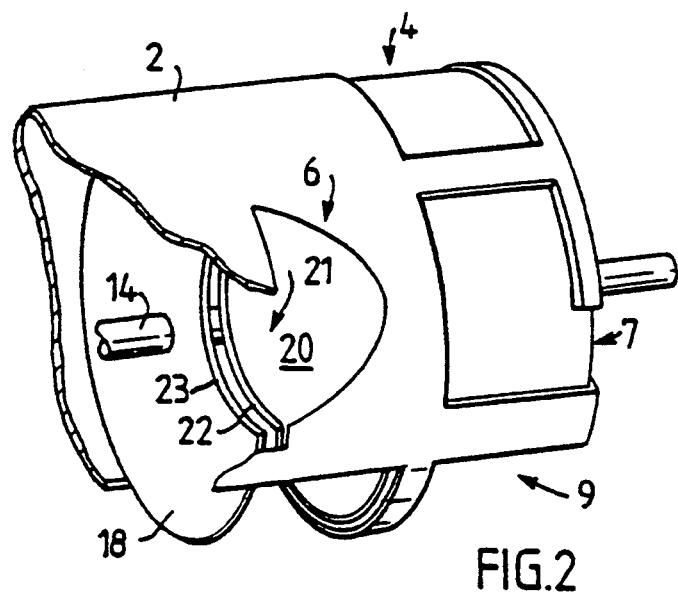
FIG. 2 shows a perspective view of the right portion of the distribution unit of FIG. 1, FIGS. 3A&B show in perspective view exposed portions of the distribution unit of FIG. 1, with FIG. 3A showing the housing and FIG. 3B the valve device placed in the housing.
Figure 3A:
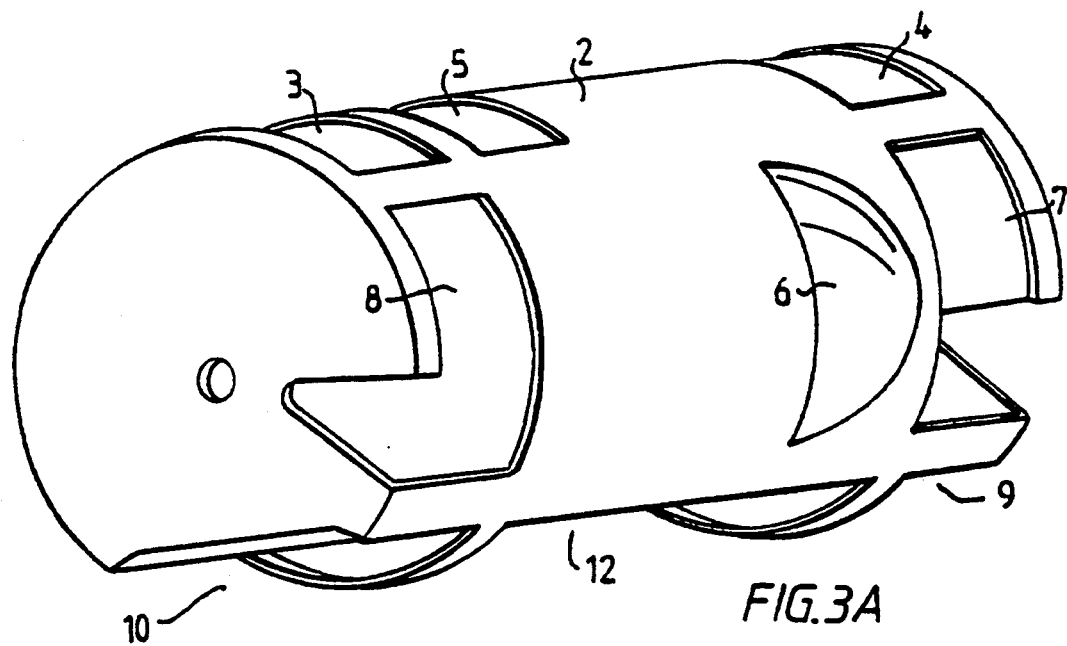
Figure 3B:
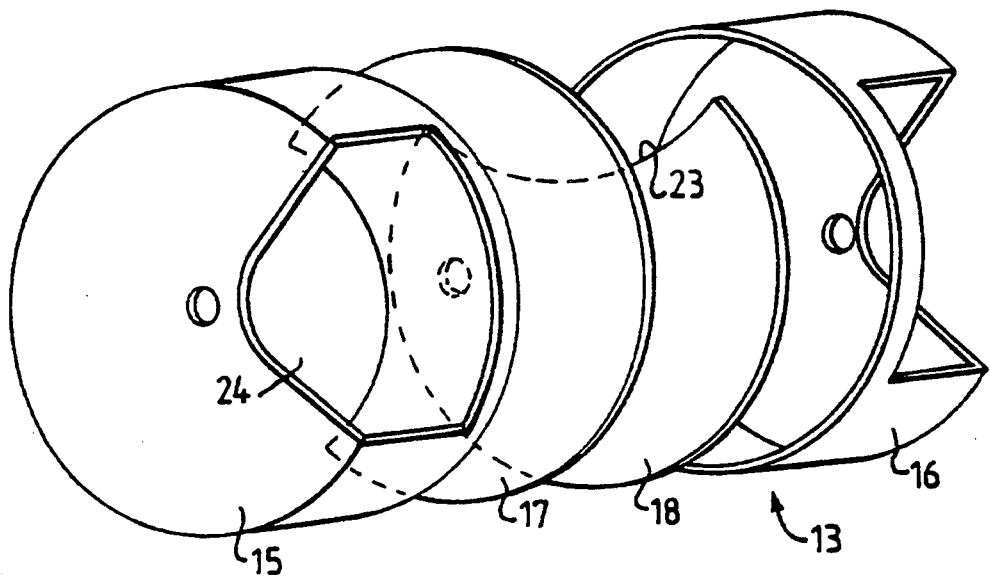

As shown in more detail in FIG. 2, the outlet 6 comprises a concavity 20 which is placed in the shell surface of the housing 2 and which has an aperture 21 which is directed substantially towards a radial plane located in the interior of the housing and forms the outlet 6. The valve element 18 is disc-shaped and is intended to abut sealingly in the axial direction against an edge portion 22 of the aperture 21 which belongs to the concavity 20, although for the sake of clarity FIG. 2 shows the valve element 18 at a certain distance from the edge portion 22. In the valve element 18 there is a cutout 23 which corresponds to the aperture 21 and which when in the rotational position shown in FIG. 2 allows air to flow out via the outlet 6. The outlet 5 is displaced in the circumferential direction relative to the outlet 6 but is otherwise designed correspondingly to the outlet 6. As shown in FIG. 1, air entering between the two valve elements 17 and 18 can leave the housing 2 via the outlets 5 and 6. FIG. 3A shows the housing 2 with its various outlets 3-10 and the inlet 12. In FIG. 3B the various valve elements 15-18 included in the valve device 13 are shown exposed from the housing 2 in a position relative to the housing of FIG. 3A in which only the outlets 7 and 8 are open. As illustrated, the valve element 15 has both in its end and in its shell surface an aperture 24 which according to the rotational position is situated centrally to one or more of the outlets 3, 8 and 10. The same applies correspondingly to the valve element 16.

Air flowing in between the valve elements 17 and 18 always leaves the space between the two valve elements via the cutouts in them, irrespective of the rotational position of the valve device 13. In the case of each valve element 17, 18 this involves the possibility of air being distributed either entirely to the pertinent outlet, or partly to the outlet and partly to the end of the housing, or entirely to the end of the housing. The shape and position of the various apertures and cutouts in the valve elements 15-18, as also the shape and position of the various outlets in the housing 2, may naturally be varied, depending on the air distribution intended. For example, if only limited rotation of the valve device 13 is intended, the possibilities for maintaining operation include making the two valve elements 17, 18 segment-shaped instead of circular, thereby achieving a more unhindered flow out towards the ends of the housing.

Figure 4:
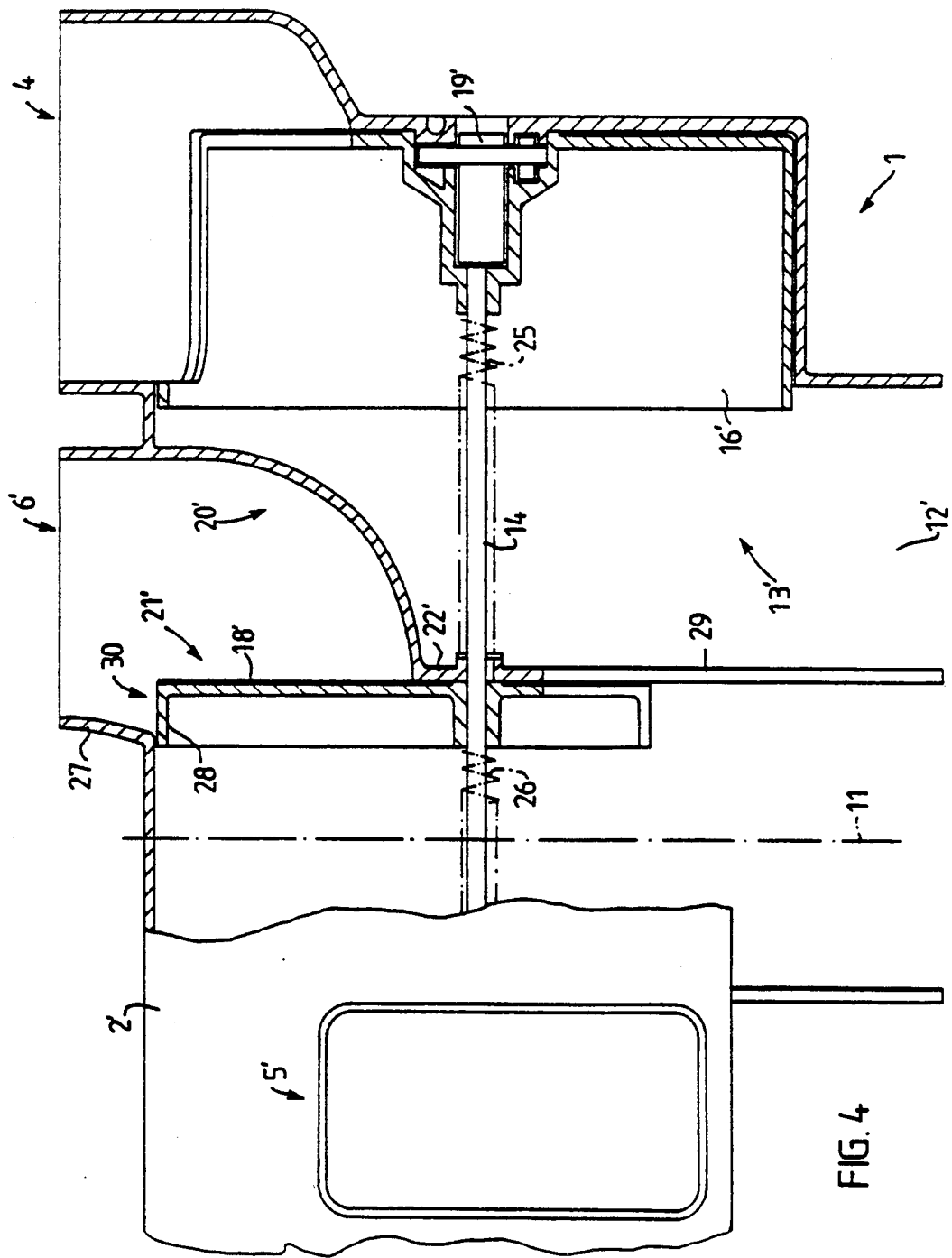
FIG. 4 shows, partly in section, a portion of an alternative embodiment of a distribution unit according to the invention.

A variant of the distribution unit described is illustrated in FIG. 4. Components X with similar functions to components in FIGS. 1-3 have the same numerical references but are distinguished as X'. The dog 19' on the shaft 14' is fitted at one end of the housing 2' and is intended to mesh with a rotatable shaft located outside the housing in a rotary arrangement. The edge portion 22' adjoining the concavity 20' forms here a bearing for the shaft 14' and also provides support for a spring 25 which for sealing purposes urges the valve element 16' towards the end of the housing 2'. Another spring 26 is placed between the two valve elements 17' and 18' and urges them apart to sealingly abut against the respective edge portions 22' of the respective outlets 5' and 6'. As illustrated, the outlet 6' includes outside the housing 2' a projection 27 for connecting an air duct. Unlike the version according to FIGS. 1-3, the mouth of the outlet 6' extends on both sides of the radial plane in which the contact surface between the valve element 18' and the edge portion 22' is located. This is made possible by the valve element 18' being prolonged in the axial direction, in this case by means of a shell portion 28 which in the axial direction reaches in under the projection 27 in the direction away from the concavity 20' and closes an aperture 30 running in a circumferential direction in the outlet. The result when the valve element 18' is in an open position is an outlet enlargement and hence a more favourable flow with less air deviation than previously, since part of the air can flow out almost radially via the aperture 30. The adjacent valve element 17' is of similar design but may naturally also be of the same design as previously or of yet another design. The edge portion 22' is prolonged towards the inlet 12' to form a guide 29 for air flowing in.

Figure 7:
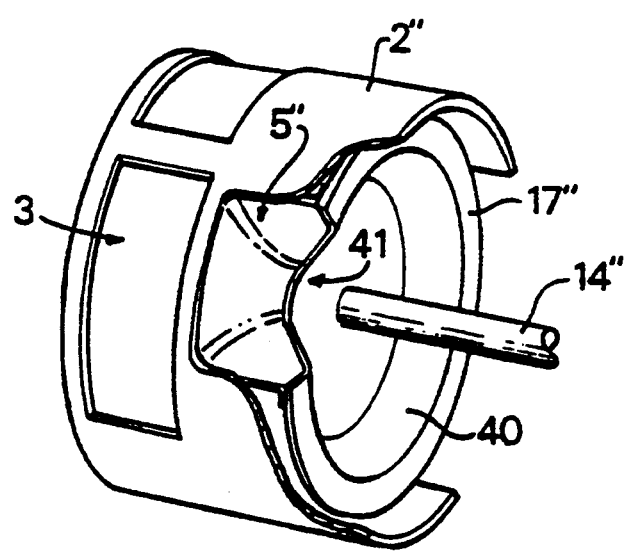
FIG. 7 shows a perspective view of the left portion of FIG. 5, seen cut away at the top and on the right in FIG. 5.
Figure 5:
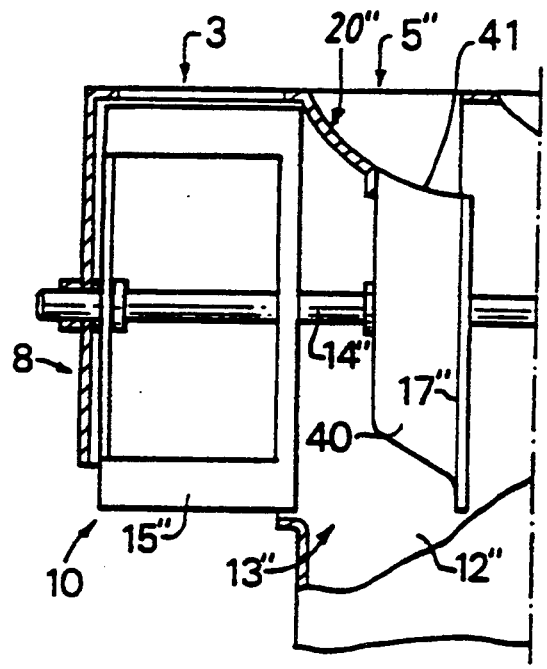
FIG. 5 shows, partly in section, a portion of a further alternative embodiment of a distribution unit according to the invention.
Figure 6:
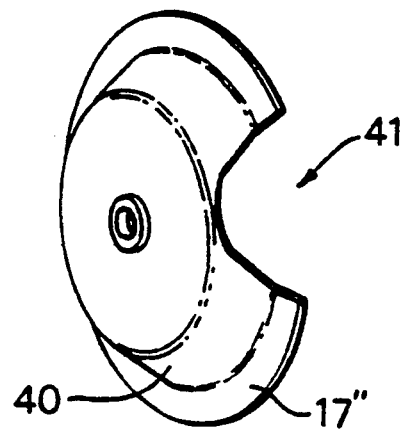
FIG. 6 shows a perspective view of the valve element 17" in FIG. 5, seen cut away at the top and on the left in FIG. 5.

Another variant of the distribution unit 1 is illustrated in FIGS. 5 and 7. Components X with similar functions to components in FIGS. 1-4 have the same numerical references but are distinguished as X''. The thin-walled circular valve element 17'' mounted on the shaft 14'' is basin-shaped. The valve element 17'' is shown in more detail in FIG. 6 and its outer edge is directed radially, abuts sealingly against the inside of the housing 2'' and adjoins a radially internal conical portion 40 which ends in a preferably flat bottom lying in a plane which runs transversely through the housing 2'' and is displaced laterally relative to the plane of the edge. This circular valve element 17'' thus has a convex shape directed towards the aperture 21'' in the concavity 20'' of the housing. The aperture 21'' has a direction obliquely in towards, but essentially towards a radial plane located in the interior of the housing. All the air will pass through a radial plane in the housing, but the conical portion 40 of the valve element 17'' forms here, from the air guidance point of view, an extension of the concavity 20'', whereby the air can be diverted less abruptly out towards the outlet 5''. The basin-shaped valve element 17'' in the alternative embodiment in FIGS. 5-7 has a cutout 41'' which extends over the edge of the valve element 17'' and in over its conical portion 40. As illustrated in FIGS. 5 and 7, the housing 2'' has a concavity corresponding to the cutout 41. When the valve device 17'' is in a rotational position such that the cutout 41 coincides with the concavity of the outlet 5'', the air can be led out to the outlet 5'' via the cutout 41. The fact that the valve device 17'' is basin-shaped and has a cutout 41 which extends over the conical portion 40 of the valve device results in a greater flow cross-section and less deviation of the air flow with consequently smaller flow losses with the least possible extent in the circumferential direction. This makes it easy for the cutout 5'' to be given higher flows and at the same time makes it possible for two or more cutouts 5'' of this type to be placed in the circumferential direction of the housing.

The conical portion also creates a favourable effect on the air flow to the outlets 3, 8 and 10 in the ends of the housing, as the conical portion 40 causes a gentle deviation of the air flow coming through the inlet 12'' further towards the ends of the housing.

The housing 2—2'', like the various valve elements 15—15''—18—18'', may with advantage be of plastic, in which case it is appropriate for each outlet to have projections of the type shown in FIG. 4. To assist sealing, it is appropriate for the sealing surfaces of the valve elements to be coated with a sealing material such as polyamideo-pile.

With the chosen design, the outer valve elements 15—15'' and 16—16'' can be made relatively short, with the result that the axial flow paths along these valve elements can be shortened. Another result is that the housing 2—2'' can also be shortened. In the case of the two outlets 5—5'' and 6—6'', the apertures 21—21'' belonging to them inside the housing 2—2'' may face towards one another, but it is naturally also possible to position the outlets 5—5'' and 6—6'' otherwise, e.g. so that their respective apertures 21—21'' do instead face away from one another, i.e. each outlet is turned axially through 180°. This enables the length of the housing 2—2'' to be reduced further. The mutual position of the outlets can of course also be modified in the circumferential direction.

As already mentioned, the middle valve elements 17—17'' and 18—18'' may take many other forms than what is shown in the drawings. It may possibly be appropriate for the valve device 13—13'' to consist entirely of a number of valve elements of the type referenced as 17—17'' and 18—18'', with corresponding adjustment of the housing 2—2''. The drawings presented here show only one outlet for each of the valve elements 17—17'' and 18—18'', but it is also possible to employ in the circumferential direction a number of outlets for each such valve element, possibly of different shapes and with different axial directions, depending on what is required and desired.

The inlet 12—12'' has with advantage an inlet area which is large relative to the outlet area, resulting in small flow losses. Flow losses may be further reduced by also making any walls and the valve elements facing the inlet relatively thin.

I claim:

1. A distribution unit for a ventilation installation for a vehicle for distributing ventilation air to various locations in the vehicle, the distribution unit comprising:
   a housing defined by an at least partly cylindrical shell surface; at least one outlet defined in the shell surface and comprising a concavity in the shell surface, the concavity having one axial side which is open for defining an aperture oriented to be directed substantially toward a radial plane in the interior of the housing;
   a valve device disposed inside the housing and rotatable therein on an axis parallel to the shell surface of the housing for controlling air flow to the at least one outlet in the shell surface; the valve device including a circular valve element located in the housing at the aperture of the concavity, the valve element including a cut out therein which is opposable to the aperture of the concavity, and the valve device being rotatable in the housing for the cut out to completely open, partially open or close off the aperture selectively, the valve element also forming a separating wall in the housing.

2. The ventilation distribution unit of claim 1, wherein the valve element has a radial outer portion in which the cut out in the valve element is defined.

3. The ventilation distribution unit of claim 1, wherein the shell surface is shaped to define a peripheral edge of the aperture in the concavity, and the valve element is at the peripheral edge of the aperture.

4. The ventilation distribution unit of claim 3, wherein the shell surface and the concavity are so shaped that the peripheral edge of the aperture of the concavity of the housing is in a radial plane;
   the valve element is disk shaped and the valve element is so placed that the cut out is in the same radial plane as the aperture of the concavity.

5. The ventilation distribution unit of claim 4, wherein the outlet from the shell surface has a mouth at the shell surface, and the concavity and the outlet are so shaped and positioned that the mouth of the outlet is located axially at both sides of the radial plane of the aperture of the concavity;

the valve element being axially prolonged in a direction away from the cavity; a second aperture in the circumferential direction of the housing and connecting to the aperture of the concavity in the radial plane, and the prolongation of the valve element being shaped to close the second aperture in the circumferential direction of the housing upon selected rotation of the valve element.

6. The ventilation distribution unit of claim 3, wherein the housing has opposite axial ends and regions of the shell surface near the housing ends and outlets in the shell surface toward the end regions of the housing;

the valve device including axially separated, axially outer second valve elements beyond the first mentioned valve element, and toward the ends of the housing; each outer second valve element having a respective valve element shell surface and an end with a cooperating outlet for cooperating with the outlet in the shell surface of the housing.

7. The ventilation distribution unit of claim 6, wherein the housing has an air inlet thereto placed generally at the first mentioned valve element for at least supplying air to the side of the first valve element away from the aperture so that the air passes by the first valve element through the cut out into the aperture.

8. The ventilation distribution unit of claim 7, wherein the air inlet is of such axial extent that the air is supplied to the housing at both the axial sides of the first mentioned valve element and the concavity in the housing blocks air flow through the respective housing outlet at the concavity from the axial side of the first mentioned valve element that is toward the aperture.

9. The ventilation distribution unit of claim 3, wherein the valve element is generally disk shaped, but includes a convex portion which is convex directed toward the aperture in the concavity of the housing; the cut out being defined in the convex portion.

10. The ventilation distribution unit of claim 9, wherein the convex portion of the valve element is generally conically shaped, at least in the part thereof with the cut out therein.

11. The ventilation distribution unit of claim 10, wherein the cut out extends radially to the outer portion of the valve element.

12. The ventilation distribution unit of claim 1, having at least two of the outlets in the shell surface, each outlet having a respective one of the concavities and each concavity having a respective one of the apertures, the outlets being axially separate; and a respective one of the valve elements in the housing with the respective cut out for each aperture.

13. The ventilation distribution unit of claim 12, wherein the housing has an air inlet which at least in part delivers air to the respective side of each of the valve elements away from the respective aperture, so that air passes through the cut outs into and through the apertures.

14. The ventilation distribution unit of claim 12, wherein the housing has opposite axial ends and regions of the shell surface near the housing ends, and further outlets in the shell surface toward the end regions of the housing;

the valve device including axially separated, axially outer second valve elements beyond the first mentioned valve elements and toward the ends of the housing; each second outer valve element having a respective valve element shell surface inside the housing and having an end and having outlets defined in it for cooperating with the outlets in the shell surface of the housing.

15. The ventilation distribution unit of claim 14, wherein the outer second valve elements are of greater axial length than the first mentioned valve elements which form the separating walls at the respective apertures.

16. The ventilation distribution unit of claim 12, wherein the housing outlets including the concavities and the apertures thereof are mutually displaced circumferentially around the housing.

17. The ventilation distribution unit of claim 1, further comprising an air inlet to the housing communicating to the side of the valve element away from the aperture, so that air passes through the cut out and through the aperture.

* * * * *